United States Patent
El-Banna

[15] 3,697,857
[45] Oct. 10, 1972

[54] POWER SUPPLY AND CONTROL CIRCUIT

[72] Inventor: Mahmound El-Banna, Montreal, Quebec, Canada

[73] Assignee: Canadian Marconi Company, Montreal, Quebec, Canada

[22] Filed: April 15, 1971

[21] Appl. No.: 134,234

[30] Foreign Application Priority Data

May 7, 1970    Canada......................082190

[52] U.S. Cl. ..................321/20, 321/14, 321/27, 325/186
[51] Int. Cl. ................................H02m, H04b 1/04
[58] Field of Search ....321/2, 18, 20, 27, 14; 323/23; 325/185, 186; 307/45, 46, 77

[56] References Cited

UNITED STATES PATENTS

| | | |
|---|---|---|
| 3,161,778 | 12/1964 | Harrison et al. .........307/77 X |
| 3,293,530 | 12/1966 | Baude.....................321/18 X |
| 2,356,269 | 8/1944 | Potter......................321/18 |

FOREIGN PATENTS OR APPLICATIONS

| | | |
|---|---|---|
| 152,020 | 12/1962 | U.S.S.R. ......................321/18 |
| 1,312,007 | 11/1962 | France..........................321/18 |
| 29,692 | 12/1969 | Japan ..........................321/20 |

*Primary Examiner*—William H. Beha, Jr.
*Attorney*—Fetherstonhaugh & Co.

[57]     ABSTRACT

A power supply and control circuit for providing a high voltage DC output from a low voltage DC source, i.e., a DC battery, especially useful for solid state transmitters. The source is connected across the input and a second source is connected between one terminal of the first source and a corresponding terminal of the input, the second source being in series aiding relationship to the first source. A transistor is serially connected between the first source and the second source, and a diode is connected across the first source with one electrode between the transistor and the second source and the other electrode at the second terminal of the first source. The diode provides short circuit protection.

3 Claims, 4 Drawing Figures

INVENTOR
M. EL-BANNA

POWER SUPPLY AND CONTROL CIRCUIT

This invention relates to a novel power supply and control circuit. More specifically, this invention relates to a novel power supply and control circuit which supplies controllable voltages of various values from a voltage source of a different value at a high efficiency rate.

Although not restricted thereto, this invention is especially applicable when it is required to drive a high power solid state transmitter with 28 VDC from a 13 VDC supply source, and will be described below as employed in this role.

The design of high power VHF or UHF transistor amplifiers presents many unique problems. In mobile transmitters, low operating voltages (13 VDC) and relatively high power levels (in excess of 100 watts RF output power) result in impedances that become very small and circulating RF currents that become very large. This complicates the transmitter output matching and makes the stability of the amplifier difficult to control.

These design disadvantages can be reduced by using RF power transistors with higher collector supply voltages (such as 28 VDC) in the high power stages of the transmitter. The 28 VDC supply is usually obtained from a DC to DC inverter supplied from a 13 VDC battery. However, this expedient has disadvantages of its own. Thus, the inverter introduces increased costs, power consumption, and weight.

It is, therefore, an object of the invention to provide a power supply and control circuit which reduces, to some extent, some of the above disadvantages.

According to the invention, a power supply and control circuit comprises, first and second input terminals; first and second output terminals for providing an output voltage; said second input terminal being connected to said second output terminal; a first power source connected to said first and second input terminals; a second power source connected in series between said first input terminal and said first output terminal and a first transistor connected in series between said first input terminal and said second power source; means for sensing the voltage at said first output terminal; and control means, driven by said sensing means, for controlling the state of said transistor.

Preferably said first power source comprises a DC battery having a positive terminal and a negative terminal and wherein said second power source comprises a DC to DC inverter having a positive output terminal and a negative output terminal; said DC to DC inverter being driven by said DC battery.

The sensing means may comprise a potential divider connected between said first and second output terminals, and wherein said control means comprises transistorized circuitry means, the base of one transistor of said circuitry means being connected to a tap on said potential divider.

Additionally, for current protection, a diode may be connected between the junction of said first transistor and said second power source and the second input terminal.

The invention will be better understood from an examination of the following description together with the accompanying drawings in which.

Figure 1:
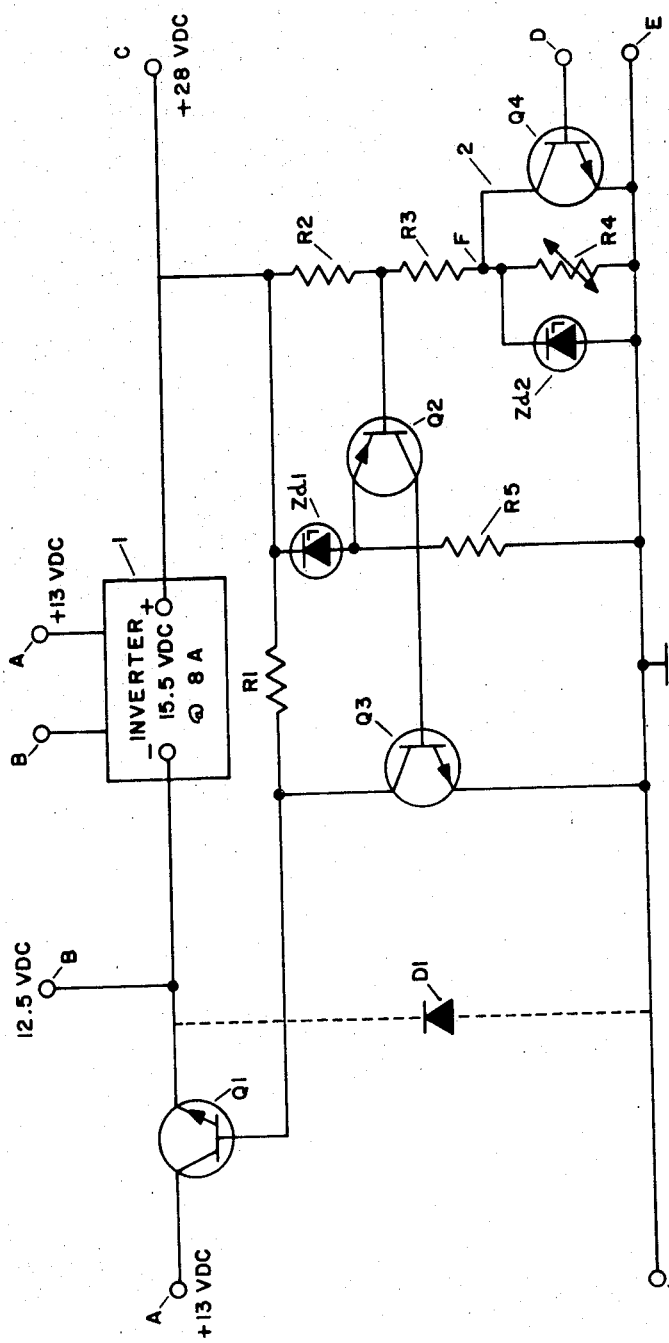
FIG. 1 illustrates a preferred embodiment of the invention in circuit diagram form.

FIG. 1 illustrates a specific embodiment which will provide a + 28 VDC output from a + 13 VDC primary input. The input is applied at terminals AB as shown and the output is taken from terminals CE as shown. Transistor Q1 is in series with inverter 1 in the positive line between the input and the output. A potential divider, consisting of resistors R2, R3 and network 2, the function and operation of which will be explained below, is connected across the output, and the output is connected, through resistor R1, to the base of transistor Q1. Transistor Q2 has its base connected to the junction of R2 and R3, and the collector of Q2 feeds the base of a further transistor Q3. The emitter of Q2 is connected to the junction of a Zener diode Zd1 and a resistor R5, while the emitter of Q3 is connected to ground. The cathode of Zd1 and the collector of Q3 are connected at opposite ends of resistor R1. The inverter 1 is fed from the same 13 VDC source as is the power supply and control circuit.

The circuit operates as follows: under normal conditions, i.e., when the source is supplying exactly 13 VDC, Q1 is biased to saturation so that the drop across the collector-emitter terminals of Q1 is 0.5 V and the voltage at B is 12.5 V. The inverter is designed to produce 15.5 VDC with a 13 VDC input so that the voltage at point C is 28 VDC. The values of R2, R3 and Zd2 (which keeps point F at a constant voltage under normal conditions) are so chosen that, when the voltage at point A is 13 VDC, both Q2 and Q3 are non-conducting.

The circuit provides overvoltage, i.e., an increase in primary supply voltage, protection in the following manner. When the voltage at point A is increased, the inverter voltage increases accordingly so that the voltage at point C would tend to increase. However, when this happens, Q2 will begin to conduct causing Q3 to conduct so that current will flow through Q3 to ground. Thus, the voltage at the base of Q1 is reduced so that Q1 becomes less conductive and the voltage at the emitter of Q1 (Point B) is decreased, i.e., the emitter-collector voltage is increased. The circuit is so arranged that the increase in inverter voltage is matched by the decrease in voltage at point B so that the voltage at point C remains constant at 28 VDC. As will be seen below, the decrease in voltage at point B constitutes a useful control in supplying the various stages of a transmitter.

In presently available power supply circuits, the RF power transistors may be damaged when the battery voltage increases because such an increase in battery voltage will increase both the collector supply voltage and the RF drive, thus increasing the power dissipation of the RF transistors. The increase in dissipation is especially dangerous at high temperatures.

Figure 2:
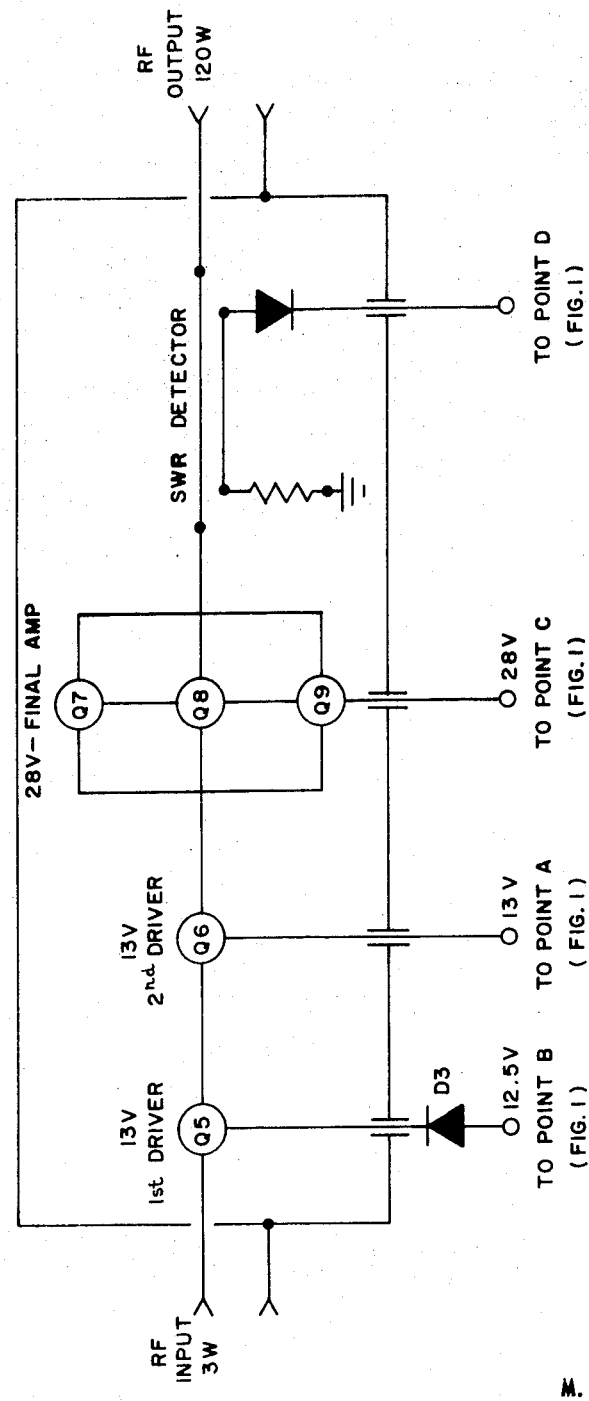
FIG. 2 illustrates how the inventive control circuit may be connected to different points in a transmitter.

An examination of FIG. 2 illustrates how this is avoided with the inventive circuit. As can be seen in FIG. 2, the first RF driver, Q5, is supplied from point B in FIG. 1 whereas the second RF driver, Q6, is supplied directly from the battery. The RF final transistor Q7, Q8 and Q9, are supplied from point C. If the battery voltage increases, the voltage at point C will remain constant at 28 VDC as explained above. The output power of Q6 would tend to increase because of the increase in battery voltage. However, because of the fall in voltage at point B, as described above, the drive from Q5 to Q6 will be decreased enough to compensate for the increased drive of Q6, so that the output power of Q6, i.e., the drive to the final RF transistors, will not be significantly changed when the battery voltage increases. Thus, both the RF drive and the DC supply voltage for the final RF transistors are maintained substantially constant in the face of an increase in primary supply voltage.

The RF power transistors will be protected from extreme load mismatch by controlling the voltages at points C and B (in FIG. 1) from an external source at terminal D. Terminal D can be connected, for example, to the output of a strip line standing wave ratio detector which is connected between the transmitter output and the antenna socket (see FIG. 2). Under normal operation, conditions, Q4 is non-conducting and the voltage at F is the zener diode voltage of Zd2. In the case of a mismatch, voltage will appear between the points D and E causing transistor Q4 to conduct. As a result, current will not longer flow through Zd2 so that the voltage at point F will no longer be held constant, and, in addition, more current will flow through R2 and R3. Thus, the voltage across R2 will increase so that the voltage at the base of Q2 will decrease causing Q2 and Q3 to conduct, which in turn cuts off Q1. Accordingly, the voltage between the collector-emitter terminals of Q1 will increase so that the voltage at point B will decrease, and the voltage at point C will decrease by a like amount. (As the primary supply voltage does not change, the inverter voltage will not change). As can be seen in FIG. 2, a decrease in the voltage at point B will decrease the collector voltage of Q5 so that the drive to the RF transistors will be decreased. Additionally, the drop in voltage at point C will decrease the voltage at the collectors of the RF transistors. Thus, both extremes of mismatch, i.e., open circuit or short circuit antenna socket, are provided with equal protection.

The RF transistors are also protected against excessive rise in environmental temperature by including in the circuit thermistor R4 between point F and ground as shown in FIG. 1. The thermistor R4 would be mounted near the studs of one of the Rf transistors. R4 is selected so that, at room temperature it will have a high value of resistance, but at high temperatures, the resistance of R4 will decrease in value. Under normal operating conditions, i.e., room temperature in this case, the resistance of R4 is high enough so that most of the current flowing through R2 and R3 will be taken by Zener diode Zd2. (This, of course, is under the condition of no mismatch so the Q4 is non-conducting. As this condition is assumed to continue during the following analysis, the action of Q4 can be disregarded here). Thus, the voltage at point F will remain constant at the Zener diode voltage. As temperature increases, the resistance of R4 will decrease so that the current flowing through R2 and R3 will be divided between R4 and Zd2. However, as long as enough current flows through Zd2 to maintain the Zener diode voltage, the action of the circuit will not be altered.

At some predetermined temperature, the value of resistance of R4 will decrease to such a value that substantially all of the current flowing through R2 and R3 will be taken by R4. At this point, the current flowing through Zd2 will not be enough to maintain the Zener diode voltage, so that the voltage at point F will fall. Accordingly, the voltage dropped across R2 will increase and the voltage at the base of Q2 will decrease so the Q2 and Q3 will begin to conduct. As explained above with respect to mismatch protection, this action will decrease both the drive to the RF transistors and the voltage at the collectors thereof, thus reducing the dissipation in the Rf transistors in the face of excessive temperatures rises and providing protection to the RF transistors against such excessive rise in temperature.

Overcurrent and short circuit protection may be provided by the resistor R1, the internal resistance of the inverter, the voltage of the inverter, and the current amplification factor of Q1, all of which limit the value of current through Q1 as is well known in the art. However, this will provide only short term protection as the value to which the current could be limited in this way, taking into account that the value of R1, the internal resistance of the inverter, the voltage of the inverter, and the amplification factor of Q1, must be such as to give satisfactory performance during normal operation, would cause Q1 to burn out if the short were maintained for several seconds.

Long term short circuit protection is facilitated in the inventive circuit by providing a diode D1 between the emitter of Q1 and ground (shown in dotted lines in FIG. 1) with the cathode connected to the emitter of Q1 and the anode connected to ground. Under normal operating conditions, the cathode is at a positive potential relative to the anode, so that the diode is open and does not affect circuit operation. However, when a short develops between C and E, then C goes to ground potential and the drop across CE is equal to zero. All of the 28.5 V in the positive line will then be dropped across the collector-emitter terminals of Q1 as this is the highest resistive element in the line. Thus, point B falls to −15.5 VDC and the cathode of D1 is negative relative to its anode so that D1 conducts shorting out the inverter terminals. As a result, no bias current will flow through R1 so that Q1 will be cut off.

Figure 3:
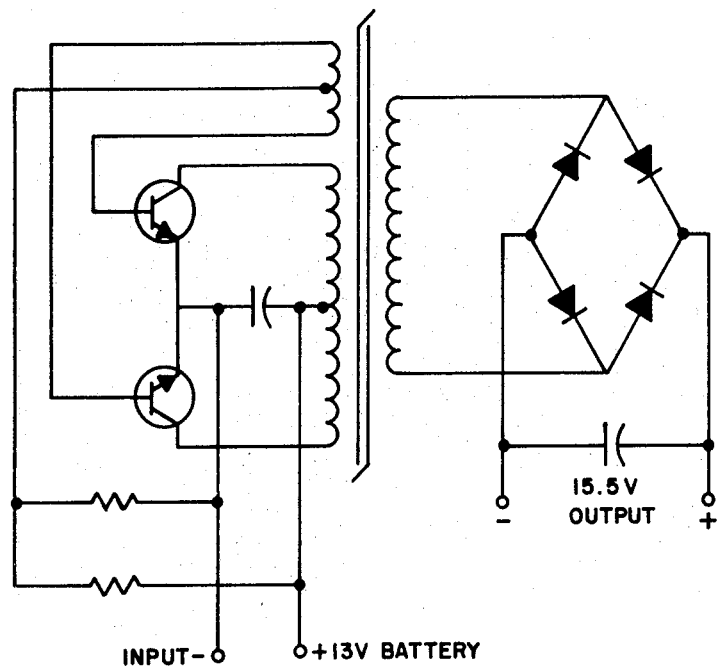
FIG. 3 illustrates a preferred inverter to be used in the inventive control circuit.

FIG. 3 illustrates a one transformer DC to DC inverter which may be used accordance with the invention. Such inverters are well known in the art, and, as is well known in the art, it is inherent in the design of such an inverter that, when its terminals are short circuited, the current is limited to a low, safe value to protect the inverter. Returning to FIG. 1, when the terminals of the inverter are shorted, the current through Q1 will be limited to a very low value so that it can, even in the face of a short circuit across CE, operate for a long period of time without danger of excessive dissipation.

The RF transistors are also protected against damage in the event of a short across CE because, during the short, the voltage at point B is negative with respect to ground. As a result, diode D3 in FIG. 2 will not conduct so that no voltage will be applied to the collector of Q5. Thus, the drive to the RF transistors will be removed, and the RF transistors, which would be damaged if driven with no collector voltage applied thereto, are protected from harm.

When the transmitter amplifier is appreciably mistuned, it can oscillate and cause the RF transistors to draw a large amount of current. As a result, the RF transistors might be damaged due to excessive dissipation. However, the overcurrent protection means discussed above will limit the current in this case also and so prevent any harm coming to the RF transistors.

Figure 4:
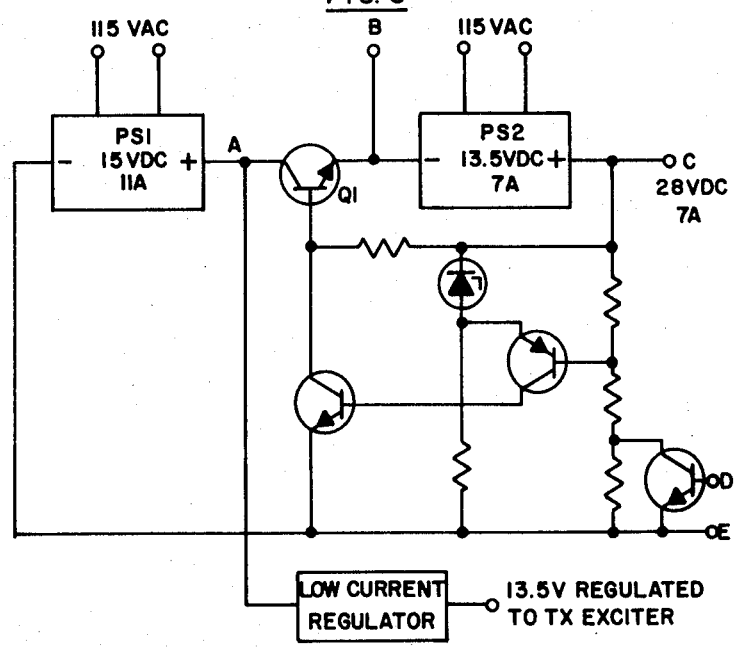
FIG. 4 illustrates the control circuit application in a base station.

The application of the control circuit is not limited to mobile transmitters, but may also be used at base station transmitters with some modification. A power supply and control circuit for use in such a base station in accordance with the invention is illustrated in FIG. 4. As can be seen, the power supply PS1 replaces the battery and the power supply PS2 replaces the inverter. Both power supplies are fed from 115 VAC source, and the power supplies need not be regulated as regulation may only be needed for the transmitter exciter. As a result, the cost, size and thermal dissipation of the power supply will be reduced.

While a negative ground control circuit has been illustrated, it will be immediately apparent to one skilled in the art that the invention can be used with a positive ground system.

While several embodiments have been described in the foregoing, it is to be understood that this was for the purpose of illustrating, but not limiting, the invention. Various modifications which will come readily to the mind of one skilled in the art are considered to be within the scope of the invention as defined in the appended claims.

I claim:

1. A power supply and control circuit comprising; first and second input terminals; first and second output terminals for providing an output voltage; said second input terminal being connected to said second output terminal; a first power source, comprising a DC battery having a positive terminal and a negative terminal, connected to said first and second input terminals; a second power source, comprising a DC to DC inverter having a positive output terminal and a negative output terminal, said DC to DC inverter being driven by said DC battery; said second power source being connected in series between said first input terminal and said first output terminal; and a first transistor connected in series between said first input terminal and said second power source; means for sensing the voltage at said first output terminal; said sensing means comprising a potential divider connected between said first and second output terminals; and control means comprising transistorized circuitry means, the base of one transistor of said circuitry means being connected to a tap on said potential divider; said control means being driven by said sensing means for controlling the state of said transistor; said power supply and control circuit further comprising diode means connected between the junction of said first transistor and said second power source and the second input terminal.

2. A power supply and control means as defined in claim 1 and wherein said potential divider comprises; a first resistor having a first end and a second end, said first end of said first resistor being connected to said first output terminal; a second resistor having a first end and a second end, said first end of said second resistor being connected to said second end of said first resistor; and a network connected between the second end of said second resistor and said second output terminal and comprising; a Zener diode having its plate connected to said second output terminal and its cathode connected to the second end of said second resistor; a thermistor connected between the second output terminal and the second end of said second resistor, and a second transistor having its collector connected to the second end of said second resistor and its emitter connected to the second output terminal, the base of said transistor being adapted to be connected to a standing wave ratio detector.

3. A power supply and control circuit as defined in claim 1 wherein; said DC to DC inverter is current limited, the positive terminal of said DC battery being connected to said first input terminal and the negative terminal of said DC battery being connected to said second input terminal and wherein said first transistor is an NPN transistor the collector of said first transistor being connected to said first input terminal; the emitter of said first transistor being connected to the negative output terminal of said DC to DC inverter; the positive output terminal of said DC to DC inverter being connected to the first output terminal; and wherein said potential divider comprises; a first resistor having a first end and a second end, said first end of said first resistor being connected to said first output terminal; a second resistor having a first end and a second end, said first end of said second resistor being connected to said second end of said first resistor; and a network connected between the second end of said second resistor and said second output terminal and comprising; a Zener diode having its plate connected to said second output terminal and its cathode connected to the second end of said second resistor; a thermistor connected between the second output terminals and the second end of said second resistor; and a second NPN transistor having its collector connected to the second end of said second resistor and its emitter connected to the second output terminal, the base of said transistor being adapted to be connected to a standing wave ratio detector; and wherein said one transistor comprises a PNP transistor, the base of said one transistor being connected to the junction of said first and said second resistors; a third resistor connected between the base of said first transistor and said first output terminal; the emitter of said one transistor being connected to the plate of a second Zener diode; the cathode of said second Zener diode being connected to the first output terminal; a fourth resistor having one end connected to the emitter of said one transistor and another end connected to the second output terminal; the collector of said one transistor being connected to the base of a third NPN transistor; the emitter of said third transistor being connected to said second input terminal; the collector of said third transistor being connected to the base of said first transistor; and further comprising first diode means connected between the junction of the emitter of said first transistor and the negative terminal of said inverter and the second input terminal.

* * * * *